(12) United States Patent
Tanaka et al.

(10) Patent No.: US 6,931,567 B2
(45) Date of Patent: Aug. 16, 2005

(54) STORAGE SYSTEM

(75) Inventors: Koichi Tanaka, Odawara (JP); Kenichi Takamoto, Odawara (JP)

(73) Assignee: Hitachi, Ltd., Tokyo (JP)

(*) Notice: Subject to any disclaimer, the term of this patent is extended or adjusted under 35 U.S.C. 154(b) by 412 days.

(21) Appl. No.: 09/754,169

(22) Filed: Jan. 3, 2001

(65) Prior Publication Data

US 2001/0016919 A1 Aug. 23, 2001

(30) Foreign Application Priority Data

Jan. 31, 2000 (JP) .................................. 2000-027201

(51) Int. Cl.⁷ .............................................. G06F 11/16
(52) U.S. Cl. ............................... 714/6; 714/9; 714/42; 711/114; 711/149
(58) Field of Search ..................... 714/6, 9, 20, 42; 711/114, 149; 365/230.05

(56) References Cited

U.S. PATENT DOCUMENTS

| | | | |
|---|---|---|---|
| 4,141,066 A | 2/1979 | Keiles | 364/119 |
| 4,817,091 A | 3/1989 | Katzman et al. | 371/9 |
| 4,991,174 A | 2/1991 | Mori et al. | 371/15.1 |
| 5,016,244 A | 5/1991 | Massey, Jr. et al. | 370/16 |
| 5,088,021 A * | 2/1992 | McLaughlin et al. | 700/82 |
| 5,091,847 A | 2/1992 | Herbermann | 395/575 |
| 5,134,619 A | 7/1992 | Henson et al. | 371/40.1 |
| 5,134,712 A | 7/1992 | Yamamoto | 395/800 |
| 5,274,645 A | 12/1993 | Idleman et al. | 371/10.1 |
| 5,313,584 A | 5/1994 | Tickner et al. | 395/275 |
| 5,546,535 A | 8/1996 | Stallmo et al. | 395/182.07 |
| 5,557,735 A | 9/1996 | Pinkston, II et al. | 395/180 |
| 5,566,297 A | 10/1996 | Devarakonda et al. | 395/182.13 |
| 5,583,987 A | 12/1996 | Kobayashi et al. | 395/182.11 |
| 5,644,700 A | 7/1997 | Dickson et al. | 395/182.07 |
| 5,699,510 A | 12/1997 | Petersen et al. | 395/185.07 |
| 5,774,643 A * | 6/1998 | Lubbers et al. | 714/6 |
| 5,790,775 A | 8/1998 | Marks et al. | 395/182.07 |
| 5,896,492 A * | 4/1999 | Chong, Jr. | 714/3 |
| 5,928,367 A | 7/1999 | Nelson et al. | 714/6 |
| 6,052,795 A | 4/2000 | Murotani et al. | 714/3 |
| 6,219,753 B1 * | 4/2001 | Richardson | 714/6 |
| 6,330,687 B1 * | 12/2001 | Griffith | 714/6 |
| 6,408,358 B1 * | 6/2002 | Uchiyama et al. | 711/114 |

FOREIGN PATENT DOCUMENTS

| | | |
|---|---|---|
| DE | 3801547 | 1/1988 |
| EP | 475 624 | 3/1992 |
| EP | 747 822 | 12/1996 |
| JP | 55-46535 | 4/1980 |
| JP | 5265914 | 10/1993 |
| WO | WO 93/18456 | 9/1993 |

OTHER PUBLICATIONS

Bhide et al., "A Highly Available Network File Server," from USENIX, winter 1991, held in Dallas, TX, pp. 199–204.

"Graceful Degradation in a Multiple Data Path Environment," *IBM Technical Disclosure Bulletin*, 16(3):912–914 (1973).

* cited by examiner

*Primary Examiner*—Robert Beausoliel
*Assistant Examiner*—Joseph D Manoskey
(74) *Attorney, Agent, or Firm*—Townsend and Townsend and Crew LLP

(57) ABSTRACT

The storage controlling apparatus has a function for setting each of a plurality of ports in a controller for the current controller or for the standby controller, so that one port is switched to the other in a controller in case an error occurs in a controller or in a port. When in a normal operation, both of the controllers can be operated so as to improve the performance of the apparatus.

13 Claims, 5 Drawing Sheets

STORAGE SYSTEM

CROSS-REFERENCE TO RELATED APPLICATION

This application claims priority from, and incorporates by reference the entire disclosures of, Japanese Patent Application No. P2000-027201, filed on Jan. 31, 2000.

BACKGROUND OF THE INVENTION

The present invention relates to a storage system for storing a data issued from a host system, more particularly to a storage controlling apparatus in the storage system connected to the host system via a fiber channel.

Preferably, computer systems should be prevented from every unexpected error to occur therein. In case such an unexpected error occurs in a computer system, it is more important to recover the system as quickly as possible than locating the error and finding the error cause so as to take countermeasures for the detected error. In particular, in case an error occurs in a storage system, the storage system must be recovered from the error before such a host system as a computer detects the error. Once the host system detects the error before the error recovery, the whole system might possibly be down (system down).

Such a controlling apparatus for a storage system is often configured as dual system consisting of a current controller and a standby controller so as to recover from errors quickly. When one controller is driven as a current controller and the other is driven as a standby controller such way, control is passed to the standby controller in case an error occurs in the current one. A quick error recovery is thus expected. Conventionally, data security has been improved by the technique. In this case, passing control to the standby controller causes the port information (WWN, port ID, etc.) of the error-detected controller to be passed to the standby controller, thereby the controller switching is done while the host system does not recognize the switching.

According to the conventional technique, even when the host system (computer) detects such a storage system error, the error-detected controller is switched to the standby one with use of a path switching program provided for the host system.

SUMMARY OF THE INVENTION

As computer systems are getting expanded in scale, improved in processing speed, as well as data to be processed in those computers is getting expanded in capacity significantly, storage systems have also been required to be improved significantly in performance, reliability, and availability so as to cope with the operations of such enhanced computer systems.

The conventional technique, however, has been confronted with a problem that the standby controller of the dual storage controlling apparatus has been actually kept in the standby state, since there is very few occasions in which a storage system error occurs. In case a computer system, which is provided with such an idle (standby) controller, is operated in the steady state, the storage system operation efficiency is reduced to just a half, while it is provided with two controllers that are high in performance, reliability, and availability respectively. This is why the computer systems have come to require a method for making it possible to use both of such dualized controllers in steady operations and switching the current controller to the standby controller in case an error occurs in the current controller.

Under such circumstances, it is an object of the present invention to enable all the components of a dual system to be used efficiently without using any program for switching the path to the host system so as to control both of the current controller and the standby controller equally and continue the operation with the standby controller even when an error occurs in the current controller.

In order to achieve the above object, the storage controlling apparatus of the present invention is provided with a plurality of controllers, each having a plurality of ports for controlling a bus protocol for the communication between the host system and itself respectively independently of others, as well as with a function for enabling each port information to be shared among those controllers and disconnecting a self-port from the loop in case an error is detected in a self-controller and in the self-port; a function for detecting an error occurred in another controller and in another port; a function for disconnecting another port from the loop; a function for connecting the self-port to the loop; a function for detecting the recovery of an error-occurred component; a function for disconnecting the self-port from the loop after detecting the recovery of an error-occurred site; and a function for connecting the error-occurred component to the loop after the recovery.

BRIEF DESCRIPTION OF THE DRAWINGS

A preferred form of the present invention is illustrated in the accompanying drawings in which.

DESCRIPTION OF THE SPECIFIC EMBODIMENTS

Hereunder, the first embodiment of the present invention will be described with reference to the accompanying drawings.

The configuration of the storage controlling apparatus in this first embodiment is just an example; the configuration may be varied freely without departing from the spirit of the present invention.

Figure 1:
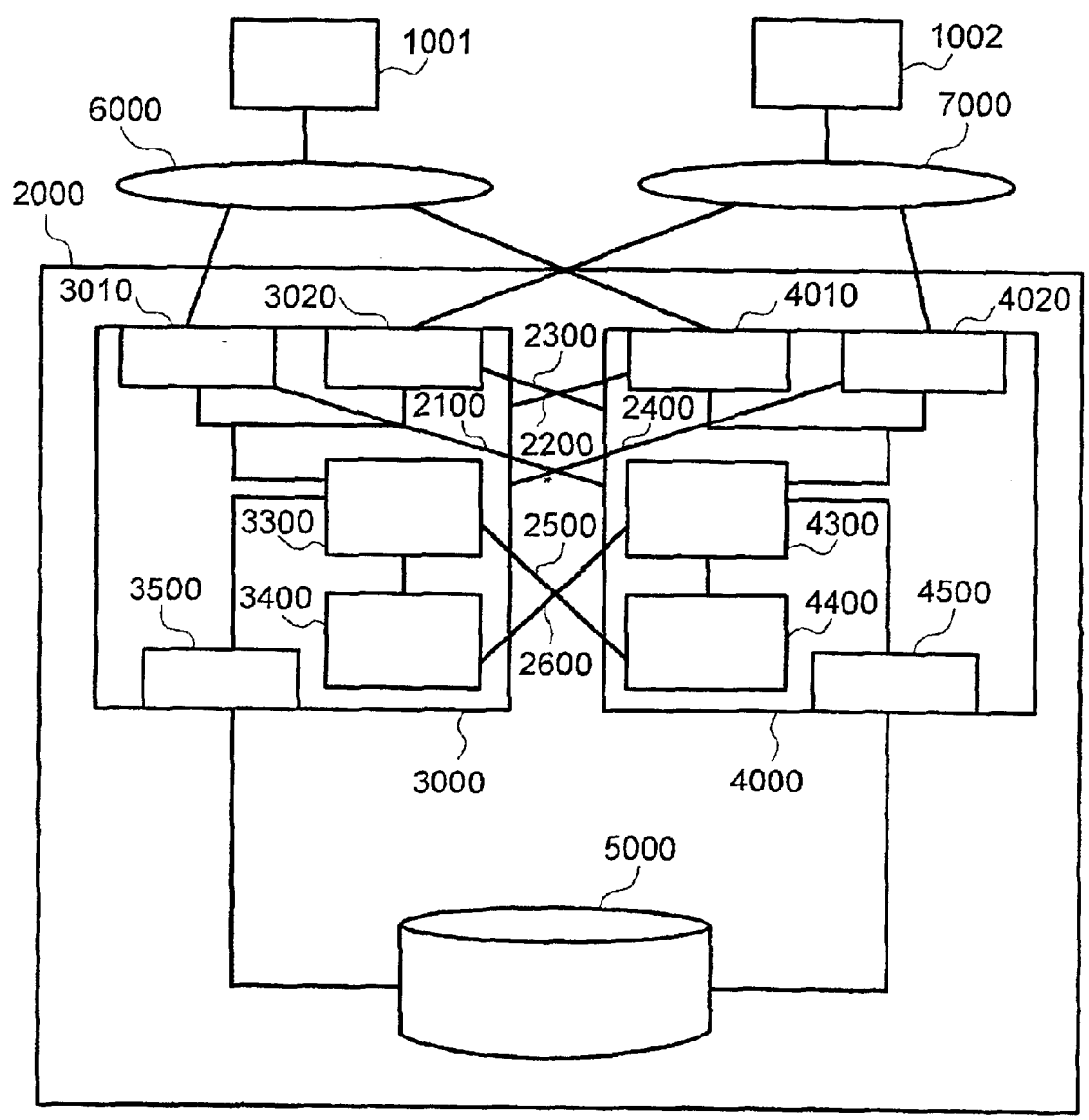
FIG. 1 is an overall block diagram of the first embodiment of the present invention.

FIG. 1 is a block diagram of the storage controlling apparatus of the present invention applied to a disk array apparatus.

In FIG. 1, reference numerals 1001 and 1002 denote host computers employed as central processing units (CPU) for processing data. Reference numeral 2000 denotes a disk array apparatus connected to each of the host computers 1001 and 1002 via a fiber channel bus respectively.

The disk array apparatus 2000 is configured by controllers (dual configuration) 3000 and 4000 and a disk unit group 5000 for storing data received from the host computers. The disk unit group is often configured as a disk array.

The controller 3000/4000 is configured by host I/F controllers 3010 and 3020/4010 and 4020 for controlling the protocol of the communication with the host computers 1001 and 1002; a data transfer controller 3300/4300 for transferring data; a non-volatile cache (hereinafter, to be referred to just the cache) 3400/4400 for temporarily storing data to be transferred from the disk unit group 5000; and a DRV I/F controller 3500/4500 for controlling the protocol of the communication with the disk unit group 5000.

A leased line 2100/2200/2300/2400 is laid between the controller 3000/4000 and the I/F controller of another controller, from which the host I/F controller can be disconnected from the loop.

The host I/F controllers 3010 and 4010 can be changed to each other. In this first embodiment, the host I/F controller 3010 is set as a standby controller and the host I/F controller 4010 is set as the current controller. In the same way, the host I/F controllers 3020 and 4020 can be changed to each other. The host I/F controller 4020 is set as the current controller for the host computer 1002 and the host I/F controller 3020 is set as a standby controller. However, the current and standby setting is just an example; it may be changed freely, of course.

The host I/F controllers 3010 and 4010 are connected to the host computer 1001 via a fiber channel loop 6000 respectively. When in a normal operation, the host I/F controller 3010 is connected to the loop 6000 while the host I/F controller 4010 stands by and it is not connected to the loop 6000. While just an example of a private loop is described here, the present invention is not limited only to the fiber channel connection form. For example, the connection form may be point-to-point connection and connection via a fabric unit.

In the same way, the host I/F controllers 3020 and 4020 are connected to the host computer 1002 via a fiber channel loop 7000 respectively. When in a normal operation, the host I/F controller 4020 is connected to the loop 7000 while the host I/F controller 3020 stands by and it is not connected to the loop 7000.

Because the present invention enables the controllers 3000 and 4000 to access the disk unit group 5000 as described above, each of the controllers controls the object exclusively so that it is prevented that one and the same disk unit in the disk unit group is accessed simultaneously from those controllers.

Figure 2:
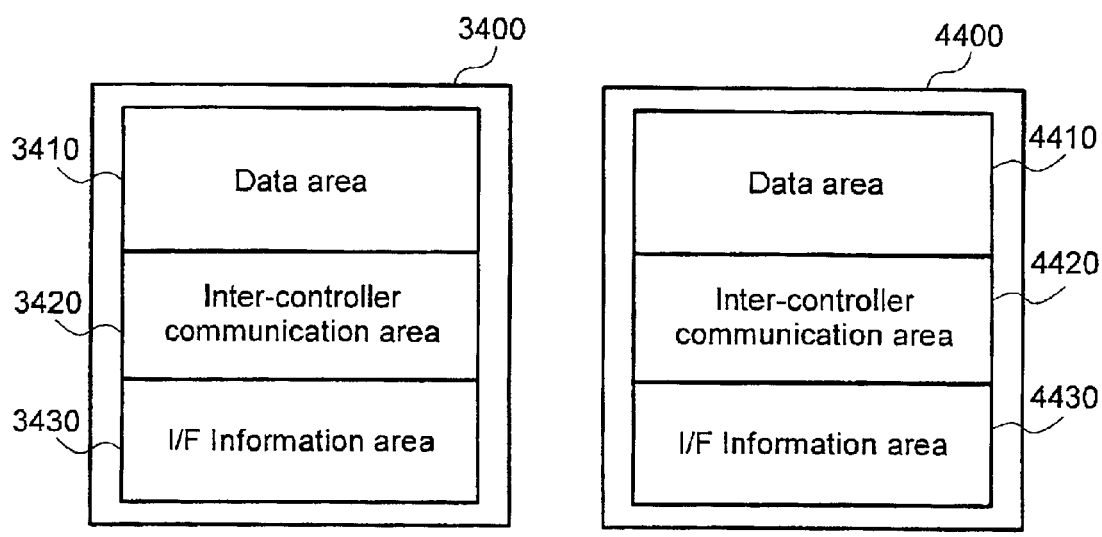
FIG. 2 is a concept chart of the data in a cache.

Next, the data in the cache 3400/4400 will be described with reference to FIG. 2.

The cache 3400/4400 is divided into a data area 3410/4410 for storing data; an inter-controller communication area 3420/4420 used for the communication between the controllers 6000 and 7000; and an I/F information area 3430/4430 for storing host I/F control information (WWN, port ID, etc.).

The cache 3400/4400 can read/write data from/in the cache of the self-controller 3000/4000 via the data transfer controller 3300/4300, as well as from/in the cache 4400/3400 of the other controller 4000/3000.

When data is written in the other controller 4000/3000, the fact is reported to the other controller 4000/3000 via the communication line 2500/2600. This reporting may be done without using the communication line; it may be done as periodical polling from the other controller.

The I/F information area 3430/4430 has an area for each of the host I/F controllers 3010, 3020, 4010, and 4020. The controller 3000/4000 keeps writing of the latest I/F information in both of the caches 3400 and 4400 in a duplicated wiring manner.

Next, a description will be made for the I/O processing from the host computer 1001/1002 in a disk subsystem with reference to FIG. 1. At first, the I/O processing from the host computer 1001 will be described.

When an I/O request is issued from the host computer 1001, the host I/F controller 3010 connected to the loop 6000 receives the I/O request and the controller 3000 executes the requested I/O processing. In case the request issued from the host computer 1001 is a read request, the controller 3000 reads the requested data from the disk unit group 5000 via the DRV I/F controller 3500 and the data transfer controller 3300, then stores the data in the cache 3400. The cache 3400 then transfers the data to the host computer 1001 via the data transfer controller 3300 and the host I/F controller 3010.

In case the request issued from the host computer 1001 is a write request, the controller 3000 writes the requested data in the cache 3400 via the host I/F controller 3010 and the data transfer controller 3300. At this time, the data transfer controller 3300 also writes the data in the cache 4400 in a duplicated writing manner. The controller 3000 then writes the data in the disk unit group via the data transfer controller 3300 and the DRV I/F controller 3500.

Next, the I/O processing requested from the host computer 1002 will be described.

When an I/O request is issued from the host computer 1002, the host I/F controller 4020 connected to the loop 7000 receives the I/O request and the controller 4000 executes the requested I/O processing. Both of the read and write processings are the same as those carried out by the controller 3000 described above. Because the current host I/F controller is set so as to be shared by both of the controllers 3000 and 4000 as described above, both of the controllers 3000 and 4000 can be operated when in a normal operation. Thus, this method can bring out the performance of those two controllers, thereby the performance of the apparatus will become almost double that of the conventional technique that makes one of the two controllers stand by when in a normal operation.

Figure 3:
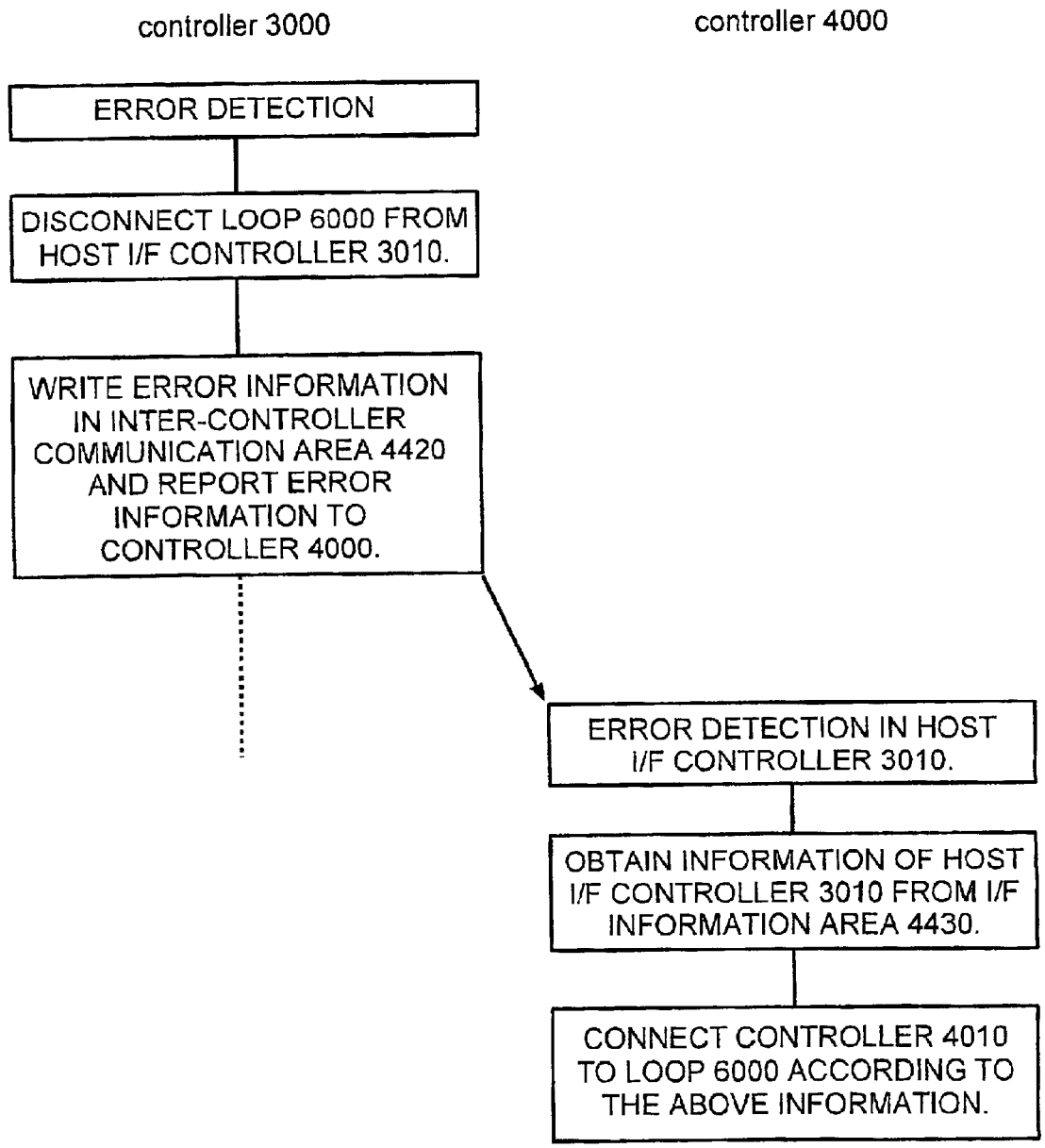
FIG. 3 is a flowchart of the error processings by a controller (or a host I/F controller 3010)
Figure 4:
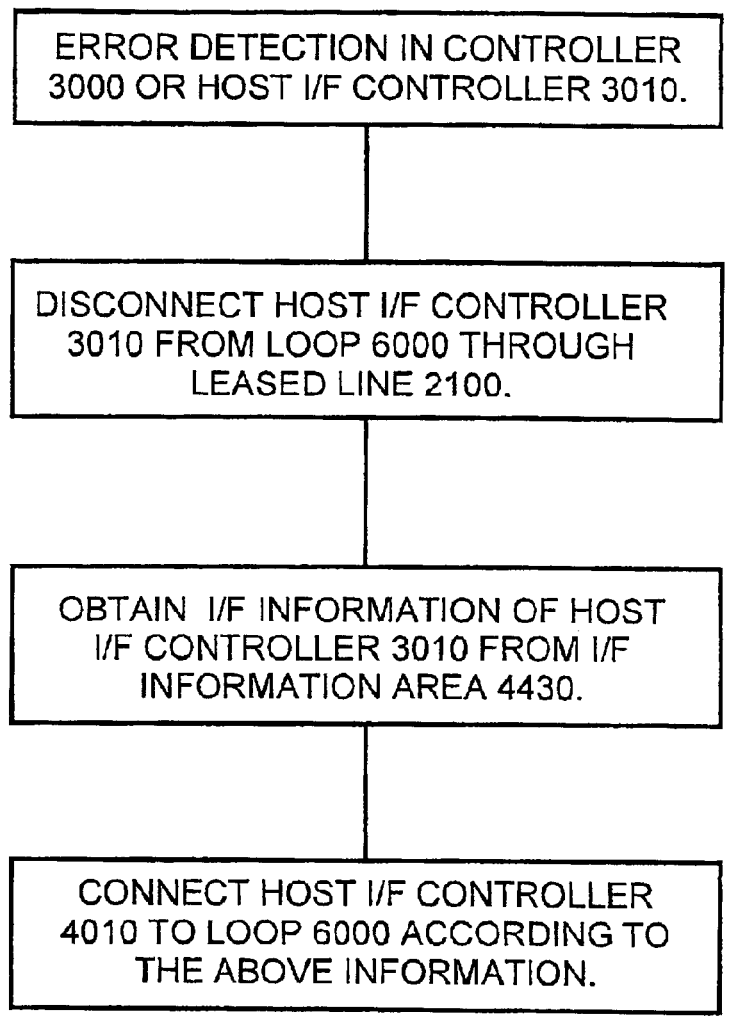
FIG. 4 is a flowchart of the error processings of a controller (or a host I/F controller 3010)
Figure 5:
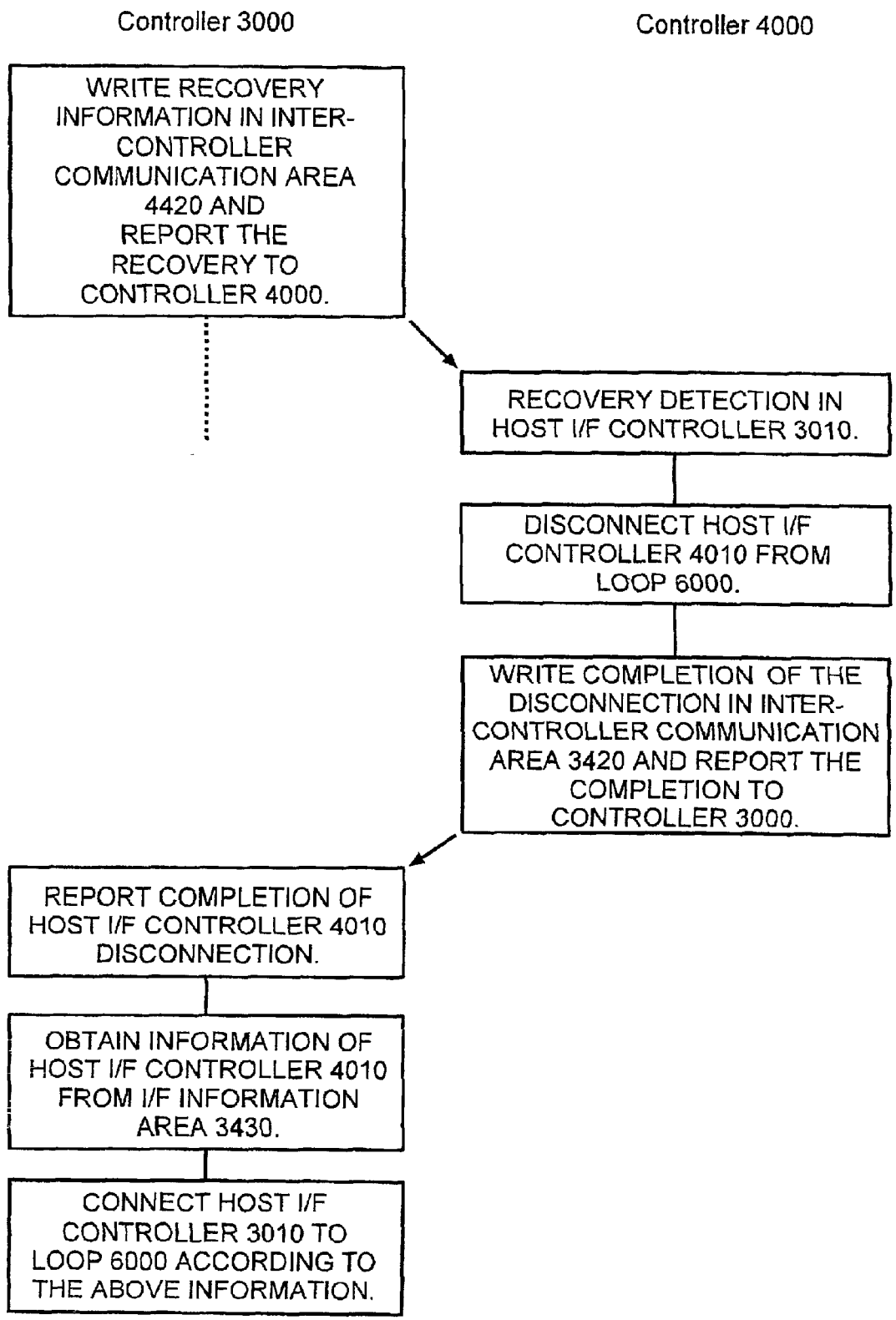
FIG. 5 is a flowchart of the error recovery processings of a controller (or a host I/F controller 3010).

Next, a description will be made for the error processings to be carried out when an error occurs in the controller 3000 or in the host I/F controller 3010 with reference to FIGS. 3 and 4.

At first, a description will be made for the error processings to be carried out for an error detected in the controller 3000 with reference to FIG. 3.

The controller 3000, when detecting an error in itself or in the host I/F controller 3010, disconnects the host I/F controller 3010 from the loop, then writes the error information in the inter-controller communication area 4420 via the data transfer controller 3300, then reports the error of the host I/F controller 3010 to the controller 4000. Receiving the error report, the controller 4000 obtains the I/F information of the I/F controller 3010 from the I/F information area 4430 and starts up the host I/F controller 4010 that has stood by with use of the information so as to be connected to the loop 6000. Next, a description will be made for an error processing to be carried out for an error detected by the controller 4000 in the controller 3000 or the I/F controller 3010 with reference to FIG. 4.

The controller 4000, when detecting an error in the controller 3000 or in the host I/F controller 3010, disconnects the host I/F controller 3010 from the loop 6000 via a leased line 2100. Then, the controller 4000 obtains the I/F information of the I/F controller 3010 from the I/F information area 4430 and starts up the host I/F controller 4010 that has stood by with use of the information so as to be connected to the loop 6000.

Such way, even after an error is detected, the host I/F controller 3010 can be switched to the standby one 4010.

Because of using the information (WWN, port ID, etc.) of the host I/F controller 3010, the host computer 1001 can continue the subject I/O processing without knowing the switching from the current host I/F controller to the standby one 4010 at all. Consequently, there is no need to provide any host controller with a path switching middleware component. Because this path switching middleware component is usually expensive, the present invention is also effective to reduce the system build-up cost.

Next, a description will be made for the processings to be carried out when the controller 3000 or the host I/F controller 3010 is recovered from an error.

The controller 3000, when recovered from an error, writes the recovery information in the inter-controller communication area 4420 via the data transfer controller 3300 and reports the recovery of the host I/F controller 3010 to the controller 4000. Receiving the recovery information, the controller 4000 disconnects the host I/F controller 4010 from the loop 6000, then reports the completed disconnection to the controller 3000 via the inter-controller communication area 3420. Receiving this report, the controller 3000 obtains the I/F information of the host I/F controller 4010 from the I/F information area 3430 and starts up the host I/F controller 3010 that has stood by so as to connect the controller 3010 to the loop 6000. The controller then exits the recovery processing.

Because the I/F information of the host I/F controller 4010 is used even for the recovery processing, the host computer can complete the recovery processing and restore the two controllers to their operations without knowing it at all.

While the host I/F controller 3010 is connected to the loop 6000 immediately after it is recovered from an error in this first embodiment, the error recovery may be done at any user-specified time or it may be done when the system is started up next time. The error recovery time may be selected by the user, of course.

According to the present invention, the storage controlling apparatus is provided with a plurality of controllers, each having a plurality of ports for controlling a bus protocol for the communication between each host computer and itself. When in a normal operation, both of the controllers can be operated. When compared with a conventional technique that uses one controller as the current one and the other as the standby one, therefore, the present invention can bring out the performance of those two controllers, thereby improving the performance of the apparatus up to almost double that of the conventional technique.

Furthermore, in case an error occurs in one controller, the error-detected controller can be switched to the other normal controller so as to continue the processing, thereby the reliability of the apparatus is more improved. The present invention also enables the path to be switched to another without using any path switching middleware component at the host controller side. Because the middleware component is usually expensive, the present invention is also effective to reduce the system build-up cost.

The foregoing invention has been described in terms of preferred embodiments. However, those skilled, in the art will recognize that many variations of such embodiments exist. Such variations are intended to be within the scope of the present invention and the appended claims.

The preceding has been a description of the preferred embodiment of the invention. It will be appreciated that deviations and modifications can be made without departing from the scope of the invention, which is defined by the appended claims.

What is claimed is:

1. A storage system with redundant components comprising:
    a plurality of disk devices;
    a first controller having a first current port connected to a first host and a first standby port connected to a second host, said first controller connected to said disk devices for data exchange between said first host and said disk devices via said first current port;
    a second controller having a second current port connected to said second host and a second standby port connected to said first host, said second controller connected to said disk devices for data exchange between said second host and said disk devices via said second current port, said second controller having stored therein port configuration information representative of said first current port; and
    a plurality of communication lines between said first controller and said second controller,
    said first controller configured to detect an error condition therein and in response to detecting said error condition, to communicate an error indication to said second controller,
    said second controller configured to detect receipt of said error indication and in response to receiving said error indication to configure said second standby port for data exchange between said first host and said disk devices based on said port configuration information.

2. The storage system of claim 1 further wherein said first controller and said second controller each have a plurality of current ports and a plurality of standby ports so as to connect a plurality of hosts.

3. The storage system of claim 1 wherein said error indication is communicated via said communication lines.

4. The storage system of claim 1 wherein said first current port and said second standby port connect to said first host and said second host via a fibre channel.

5. The storage system of claim 1, wherein said first controller is further configured to communicate a recovery indication to said second controller upon recovery from said error condition, wherein said second controller is further configured to perform a disconnect operation of said second standby port and to communicate an indication of completion of said disconnect operation to said first controller.

6. The storage system of claim 5, wherein a connection between said first host and said first controller is one of a point-to-point connection and a fabric unit, wherein a connection between said second host and said second controller is one of a point-to-point connection and a fabric unit.

7. A storage system with redundant components comprising:
    a plurality of disk devices;
    a first controller having a first current port for communication with a first host and a first standby port for communication with a second host, said first controller connected to said disk devices for reading and writing data with said first host via said first current port;
    a second controller having a second current port for communication with said second host and a second standby port connected to said first host, said second controller connected to said disk devices for reading and writing data with said second host via said second current port; and
    said first controller operable to store first port configuration information in said second controller, said first port configuration information representative of said first current port, said first controller operable to detect an error condition therein and in response to detecting said error condition, to communicate an error indication to said second controller, said second controller operable to detect receipt of said error indication and in response to receiving said error indication to configure said second standby port for reading and writing data between said first host and said disk devices based on said first port configuration information.

8. The storage system of claim 7 wherein said second controller is operable to store second port configuration information in said first controller, said second port configuration information representative of said second current port, said second controller operable to detect an error condition therein and, in response to detecting said error condition, to communicate an error indication to said first controller, said first controller being operable to detect receipt of said error indication from said second controller and in response thereto to configure said first standby port for reading and writing data between said second host and said disk devices based on said second port configuration information.

9. The storage system of claim 7 wherein said first controller and said second controller each have a plurality of current ports and a plurality of standby ports so as to connect a plurality of hosts.

10. The storage system of claim 7 further comprising a communication path between said first controller and said second controller, wherein said error indication is communicated via said communication path.

11. The storage system of claim 7 wherein said first current port and said second standby port connect to said first host and said second host via a fibre channel.

12. The storage system of claim 7, wherein said first controller is further configured to communicate a recovery indication to said second controller upon recovery from said error condition, wherein said second controller is further configured to perform a disconnect operation of said second standby port and to communicate an indication of completion of said disconnect operation to said first controller.

13. The storage system of claim 12, wherein a connection between said first host and said first controller is one of a point-to-point connection and a fabric unit, wherein a connection between said second host and said second controller is one of a point-to-point connection and a fabric unit.

* * * * *